(12) United States Patent
Tunali et al.

(10) Patent No.: US 11,537,278 B2
(45) Date of Patent: *Dec. 27, 2022

(54) INTERACTIVELY PRESENTING A VISIBLE PORTION OF A RENDERING SURFACE ON A USER DEVICE

(71) Applicant: Google LLC, Mountain View, CA (US)

(72) Inventors: Haluk Burcin Tunali, North Bergen, NJ (US); Luiz do Amaral de Franca Pereira Filho, Jersey City, NJ (US); Etan Bukiet, New York, NY (US); Behnoosh Hariri, New York, NY (US); Norbert Zsolt Kenderesi, Jersey City, NJ (US); Igor Kopylov, Brooklyn, NY (US); Matthew Jay Isison, Jersey City, NJ (US); Kevin Winter, Metuchen, NJ (US); Olga Sergeyevna Saviano, New York, NY (US); Gregory George Galante, Little Silver, NJ (US); Mathieu Turcotte, New York, NY (US); Jacob Robert Voytko, New York, NY (US); Leeran Raphaely, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,532

(22) Filed: Apr. 26, 2021

(65) Prior Publication Data

US 2021/0247891 A1 Aug. 12, 2021

Related U.S. Application Data

(63) Continuation of application No. 15/228,387, filed on Aug. 4, 2016, now Pat. No. 10,990,258.

(Continued)

(51) Int. Cl.
*G06F 3/048* (2013.01)
*G06F 3/04845* (2022.01)
(Continued)

(52) U.S. Cl.
CPC ........ *G06F 3/04845* (2013.01); *G06F 3/0485* (2013.01); *G06F 3/0482* (2013.01); *G06F 3/04883* (2013.01)

(58) Field of Classification Search
CPC .. G06F 3/04845; G06F 3/0485; G06F 3/0482; G06F 3/04883
(Continued)

(56) References Cited

U.S. PATENT DOCUMENTS

| 7,023,437 B1 * | 4/2006 | Voorhies | G06T 15/005 |
| | | | 345/419 |
| 8,499,236 B1 | 7/2013 | Keljo | |

(Continued)

OTHER PUBLICATIONS

PCT International Search Report and Written Opinion of the International Searching Authority for PCT/US2016/045571 dated Dec. 20, 2016, 19 pages.

(Continued)

*Primary Examiner* — Hope C Sheffield
(74) *Attorney, Agent, or Firm* — Lowenstein Sandler LLP

(57) ABSTRACT

The technology herein involves accessing content of an electronic document and a shared layout for the electronic document, wherein the shared layout provides a layout for user devices having different dimensions of display areas; rendering the content of the electronic document onto a primary rendering surface and a secondary rendering surface, wherein the primary rendering surface is associated with a native platform of a user device and the secondary rendering surface is associated with the shared layout of a server; applying operation commands to modify the primary rendering surface, the operation commands resulting from a (Continued)

user interaction with the electronic document; merging the operation commands into a merged operation call; and invoking the merged operation call to modify the secondary rendering surface, wherein the merged operation call reduces a number of operation calls that modify the secondary rendering surface and is shared with the server to modify the shared layout.

20 Claims, 13 Drawing Sheets

Related U.S. Application Data

(60) Provisional application No. 62/200,920, filed on Aug. 4, 2015, provisional application No. 62/200,793, filed on Aug. 4, 2015, provisional application No. 62/200,979, filed on Aug. 4, 2015.

(51) Int. Cl.
*G06F 3/0485* (2022.01)
*G06F 3/0482* (2013.01)
*G06F 3/04883* (2022.01)

(58) Field of Classification Search
USPC .......................................................... 715/243
See application file for complete search history.

(56) References Cited

U.S. PATENT DOCUMENTS

| | | | |
|---|---|---|---|
| 8,610,724 B2 | 12/2013 | Garg | |
| 8,656,290 B1 | 2/2014 | Greenspan et al. | |
| 9,330,065 B2 | 5/2016 | Damera-Venkata | |
| 9,367,641 B2 | 6/2016 | Kwan et al. | |
| 9,436,673 B2 | 9/2016 | Gera et al. | |
| 9,747,582 B2 | 8/2017 | Hunter et al. | |
| 2002/0049786 A1* | 4/2002 | Bibliowicz | G06Q 10/10 715/211 |
| 2003/0067489 A1 | 4/2003 | Wong et al. | |
| 2006/0200755 A1 | 9/2006 | Melmon et al. | |
| 2007/0220419 A1 | 9/2007 | Stibel et al. | |
| 2008/0109159 A1 | 5/2008 | Shi et al. | |
| 2011/0119573 A1 | 5/2011 | Rudolph et al. | |
| 2011/0252312 A1* | 10/2011 | Lemonik | G06F 40/186 715/255 |
| 2011/0273464 A1* | 11/2011 | Brunner | G06T 1/20 345/545 |
| 2014/0108909 A1 | 4/2014 | Geelnard | |
| 2014/0136954 A1* | 5/2014 | Ligman | G06F 3/00 715/234 |
| 2014/0189487 A1* | 7/2014 | Kwan | G06F 16/957 715/234 |
| 2014/0208197 A1 | 7/2014 | Ellis et al. | |
| 2014/0222916 A1 | 8/2014 | Foley et al. | |
| 2014/0325372 A1 | 10/2014 | Spracklen et al. | |
| 2015/0095854 A1* | 4/2015 | Olenick | G06F 3/0485 715/853 |
| 2016/0110326 A1 | 4/2016 | Ryan et al. | |

OTHER PUBLICATIONS

International Preliminary Report on Patentability for PCT/US2016/045571 dated Feb. 15, 2018, 13 pages.

TutorialsPoint, "HTML5 Canvas—Save and Restore States", Jul. 4, 2014, obtained via Internet Archive Wayback Machine located at https://web.archive.org/web/20140704163213/https://www.tutorialspoint.com/html5/canvas_states.htm, pp. 1-3.

TutorialsPoint, "XML Tree Structure", Jul. 25, 2014, obtained via Internet Archive Wayback Machine located at https://web.archive.org/web/20140725195014/https://www.tutorialspoint.com/XML/xml_tree_structure.htm, pp. 1-3.

Apple, "Coordinate Systems and Transforms", published Sep. 19, 2012, located at https://developer.apple.com/library/content/documentation/Cocoa/Conceptual/CocoaDrawingGuide/Transforms/Transforms.html, pp. 1-21.

Stefanov, "Rendering: repaint, reflow/relayout, restyle", published Dec. 17, 2009, located at http://www.phpied.com/rendering-repaint-reflowrelayout-restyle/, pp. 1-11.

Knutson, "Display Loading Image While Page Loads", published Apr. 15, 2013, located at http:J/bradsknutson.com/blog/display-loading-image-while-page-loads/, pp. 1-3.

Marur et al., "Comparison of Platform Independent Electronic Document Distribution Techniques", published Mar. 2012, 2012 International Conference on Devices, Circuits and Systems (ICDCS), pp. 297-301.

Skutin, "What Every Frontend Developer Should Know About Webpage Rendering", published in English Jun. 30, 2014, located at http://frontendbabel.info/articles/webpage-rendering-101 /, pp. 1-10.

\* cited by examiner ered on page 5 of the document on a desktop; but the
INTERACTIVELY PRESENTING A VISIBLE PORTION OF A RENDERING SURFACE ON A USER DEVICE

CROSS REFERENCE

This application is a continuation of U.S. patent application Ser. No. 15/228,387, filed Aug. 4, 2016, which claims priority under 35 U.S.C. 119 to commonly-assigned and U.S. provisional application Nos. 62/200,920, 62/200,979 and 62/200,793, all filed on Aug. 4, 2015.

This application is related to co-pending Patent Cooperation Treaty application no. PCT/US2016/045571 and U.S. non-provisional application Ser. No. 15/228,381, both entitled "SYSTEMS AND METHODS FOR INTERACTIVELY PRESENTING A VISIBLE PORTION OF A RENDERING SURFACE ON A USER DEVICE" and filed on Apr. 4, 2016.

The aforementioned applications are all hereby expressly incorporated by reference in their entirety.

FIELD OF THE INVENTION

In general, this disclosure relates to managing electronic documents on a remote storage system, in particular, to systems and methods for interactively presenting a visible portion of a rendering surface on a user device.

BACKGROUND

A remote storage system can store various electronic documents at a remote location accessible via a network connection by a user device. For example, a user can operate a user device to access an electronic document from the remote storage system, and thus can view the electronic document from a user interface at the user device. In this case, the user device receives the content of the electronic document, and presents the content on a user interface for the user to view.

The rendering process for electronic documents can be different on different user device platforms, such as a personal computer operating system, a mobile operating system, and/or the like. Programming modules and/or objects for the rendering process can be duplicated on different platforms, and any changes to the rendering module may need to be integrated for all different platforms. As different platforms can have different parameters to layout an electronic document according to the size of the user device screen, the same electronic document can be rendered differently on each of the different platforms. For example, an image within an electronic document can be presented or rendered on page 5 of the document on a desktop; but the same image within the same electronic document can be presented or rendered on page 20 of the document on a mobile phone, because the mobile phone may have a smaller rendering screen and the same document may be rendered to have more pages on the mobile phone than on a desktop computer. In this way, when multiple users are viewing the same document via different platforms (e.g., during a joint conference presentation, etc.), the different views of the document can lead to confusion among the users.

A user can change the settings within an electronic document, such as the font style, background color, and/or the like. When such change occurs, the document may be re-rendered in its entirety on a rendering surface as an updated document.

SUMMARY

Systems and methods disclosed herein provide a method of managing a state of a virtual rendering surface for an electronic document. The method includes obtaining, at a user device from a remote storage server, content relating to an electronic document, and rendering the content of the electronic document onto a first virtual rendering surface. The method further includes maintaining a second virtual rendering surface that stores a current state of the first virtual rendering surface. The method further includes obtaining an operation command relating to the electronic document, and retrieving first state information of the first virtual rendering surface and second state information of the second virtual rendering surface. The method further includes applying the operation command to the rendered content of the electronic document on the first virtual rendering surface, and updating at least one of the first state information or the second state information based on a type of the operation command.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

Figure 1:
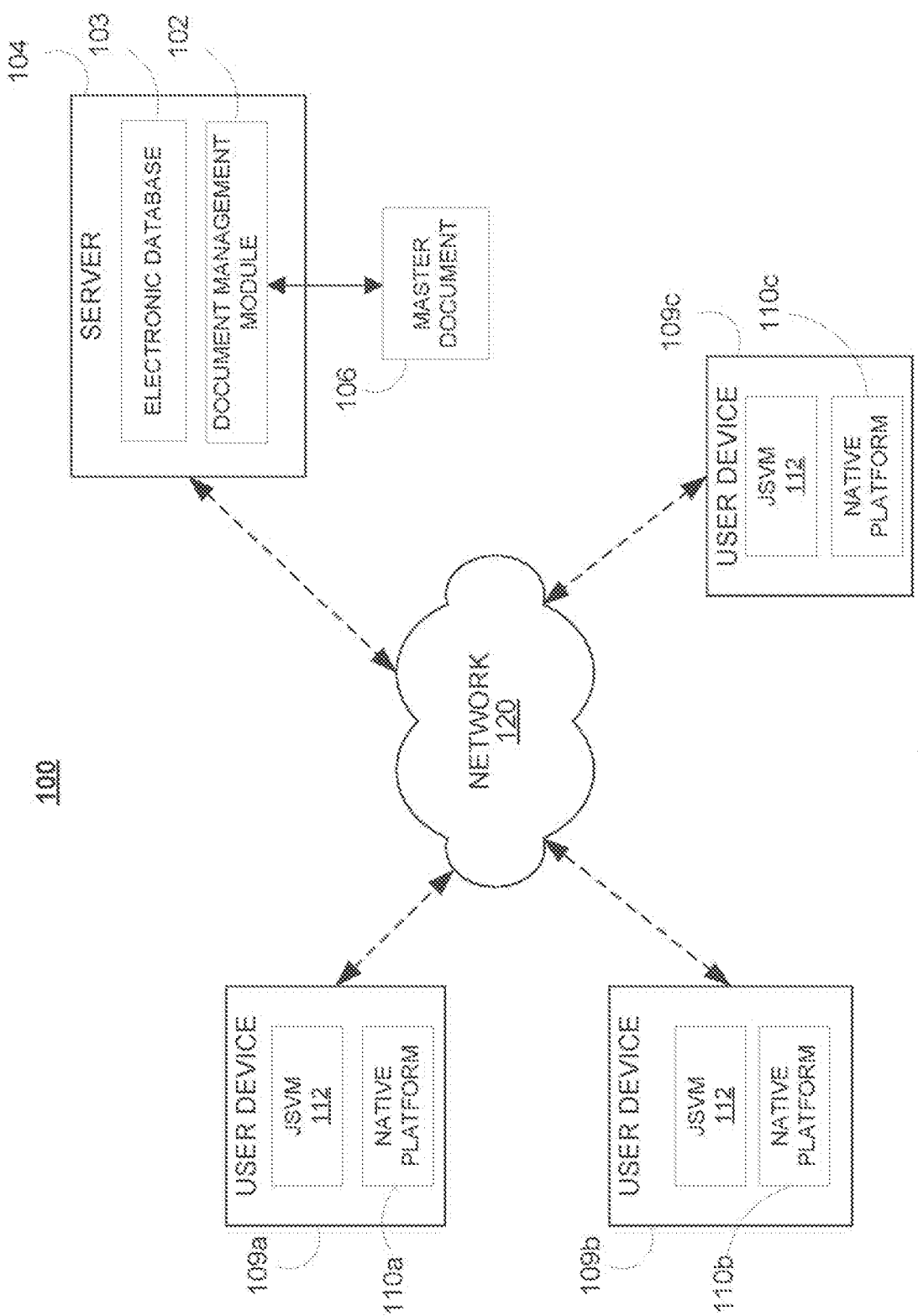
FIG. 1 is a diagram of a computerized system 100 for providing a collaborative document environment, according to an illustrative embodiment.

To provide an overall understanding of the systems and methods described herein, certain embodiments will now be described, including a system and method for interactively presenting a visible portion of a rendering surface on a user device. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

Systems and methods described herein relate to presenting a remotely accessible document on a local user device. The electronic content of the document is obtained by a user device, and presented in a visible area of the user interface of the user device. A layout process is performed to determine layout parameters, e.g., the position of an object such as a paragraph, an image, a table, and/or the like, such that the electronic content can be presented on a virtual rendering surface. For example, content with 500 paragraphs and 16 figures can be laid out as a 40-page long document. A rendering process is performed to render the electronic layout of the document on a visible area of a user interface of the user device. For example, the rendering process may determine what portion to be presented for the user to view as the user may scroll down the screen. Throughout the disclosure, the term "canvas" refers to a virtual rendering surface to render an electronic document; the term "paint" refers to rendering the electronic content onto a canvas; and the term "viewport" refers to a visible area of a user interface on the user device.

Systems and methods described herein provide a mechanism for interactive rendering of a visible portion of a rendering surface (e.g., a "canvas") of unknown size. In some implementations, the electronic document to be rendered may have a size that is much greater than the visible area of the user interface on a user device. For example, when an electronic document that has been rendered as a 40-page document on the canvas is to be rendered on the user device, only a portion (e.g., 1 page or less than 1 page) of the 40 pages is to be visibly presented to a user on the user interface. The user may also interactively select a visible portion from the 40 pages of the document to be presented, e.g., by scrolling up/down the document, zooming in or out, changing font sizes, and/or the like. In response to the user interaction, the visible portion presented on the user interface may be dynamically rendered.

In some embodiments, the rendering canvas can be divided into tiles and content of the document canvas can be rendered onto the tiles. It is noted that the tiles can be virtual units of the canvas and the content are rendered into the canvas, and the grid of tiles facilitates the rendering process to decide at which portion of the canvas (e.g., which tiles) the content should be rendered. Tiles that are visible on a user device screen can be re-rendered in response to a user's action (e.g., when a user is scrolling the document, zooming in or out, etc.), instead of re-rendering the entire document. In this way, computation complexity of rendering the document can be reduced, and a user can interactively view the rendered content with a fast scrolling user experience with improved rendering latency.

In some implementations, a painting process can issue commands to the canvas, which in turn generates a visible presentation at the viewport. Once the visible presentation is on the screen, the canvas may not need to be stored. For example, a painting process can paint a page multiple times (e.g., 30-60 times, etc.) per seconds, and each time a new canvas can be provided used during the painting process. When the painting is completed, a visible portion of a document is presented at the viewport, and the canvas used can be discarded. In some implementation, a state associated with a canvas can include parameters and settings of the canvas, e.g., font, background, etc., which can be independent of content of the document (e.g., text, image, etc.). The state of the canvas can be discarded with the canvas. For example, when a painting process finishes rendering a page on the canvas and making it visible at the viewport, the canvas states can be discarded with the canvas. In this way, the painting process only stores the rendering result, e.g., the rendered page. The canvas state, which includes settings of the canvas, can be used to configure attributes for the painting process to render a page.

In some implementations, the painting process may issue a save, restore or transform command that can be applied to a state of the canvas. For example, a canvas may have default settings such as background color (white), font (arial), transform (0, 0), and/or the like. A save command can save the default setting as the current canvas state. If the painting process sets the color to be black, and types "hello" on the canvas, a subsequent save command can save the color (black), font (arial) and transform (0, 0) to the state of the canvas. In another example, a restore command can restore the canvas state back to color (white), font (arial) and transform (0, 0). In general, a save command can save the state of the canvas and a restore command restores the state when the last save command was called.

In another example, if a user types 5 words within an electronic document, e.g., "Hello world, how are you?," with the words "Hello," "are" and "you?" drawn with (1) font: arial, size: 14, style: bold, color: black; words "world," and "how" drawn with (2) font: courier, size: 12, style: italic, color: red. In this case, the canvas state can be set to include formatting parameters for the word "Hello." Then after the word "Hello" is painted on the canvas, the painting process may change every attribute in the canvas state to a different setting to paint the words "world" and "how." Then the painting process may issue a restore command to paint the words "are" and "you?" such that the canvas state can return to the settings when "Hello" was painted. In this way, instead of having to first set the canvas state attributes to (1), and then change to (2), and then change back to (1) again, the painting process can set the canvas state to (1), paint "Hello," save the canvas state; set canvas state to (2), paint "world" and "how," restore the canvas state. So the save command can store canvas state (1) temporarily and the restore command can restore (1) such that the canvas state does not need to be set again.

In one implementation, the canvas state can include information such as but not limited to line color, fill color, font (family, size, style, etc.), text direction, line style (e.g., dash, solid, etc.), draw style (e.g., solid, linear gradient, radial gradient, etc.), transformations, clipping area, compositing mode, and/or the like. For a document that is laid-out to have five pages, every page may be painted on a canvas that is stored per page (e.g., different page may have different canvas settings). If a sentence in page 3 to be bold, then the stored canvas for that page may be changed and the whole page may be repainted. For the other pages, the previously stored canvases can be used. It is to be noted that the canvas state information, which can be stored in a stack associated with the canvas, may be stored as a snapshot of the canvas such that the canvas can be able to quickly put to screen. As further discussed in connection with FIGS. 8-9, an underlying virtual canvas paired with the "actual" canvas can be maintained in order to save a current state of the canvas. In this way, the underlying canvas can save a copy of a current state of the canvas, such that the underlying canvas can help restoring the state of the canvas without re-painting every part of the canvas.

FIG. 1 is a diagram of a computerized system 100 for providing a remote storage system to support a shared layout mechanism, according to an illustrative embodiment. Some embodiments of the systems and methods described herein provide a shared layout mechanism implemented with a remote storage system. System 100 includes a server 104 and one or more user devices, e.g., devices 109a-c, connected over a network 120. The server 104 includes an electronic database 103 and a document management module 102, which manages access requests, operation requests (e.g., save, restore, open, etc.) and updates to various versions of a master document 106 stored with the server 104. The master document 106 may be stored on the electronic database 103 on the server 104, or in a separate storage device.

The user devices 109a-c may include a variety of different devices, such as but not limited to a desktop computer, a laptop computer, a personal digital assistant (PDA), a Smartphone, a table computer, a workstation, and/or the like. Each of the user devices 109a-c may include a native platform 110a-c instantiated on the respective user device 109a-c, e.g., an operating system (OS) running on a desktop or laptop computer, a mobile (OS) running on a Smartphone, etc. The user device 109a-c may further includes a shared layout mechanism in the form of a Javascript virtual machine (JSVM 112) or other suitable form on the mobile platforms and in the browser on desktop. For example, the shared layout components can be written in the Javascript language, and the JSVM 112 can be executed on different platforms. For example, the platforms can include but not limited to APPLE® iOS, ANDROID® OS, and a browser application on a desktop or laptop computer, and/or the like. The shared component can possibly be replicated on another platform that can run a JSVM and if the native code on the other platform can communicate with the JSVM.

For example, the JSVM 112 can calculate the positions of individual document content pieces on a rendering surface of the user interface. Layout parameters such as the position of a specific word, sentence or paragraph, the position of a specific image in the document, and/or the like are then provided to different native platforms instantiated on different user devices. The native platform 110a-c can in turn use the same layout parameters to generate commands to place the relevant objects (e.g., words, sentences, paragraphs, images, etc.) onto a visible user interface on the respective user device screen. In this way, the same shared layout model (e.g., JSVM 112) can render an electronic document in a same layout on different user device platforms. For example, if an electronic document is rendered as a 40-page document on a desktop computer, the same electronic document will be rendered as the same 40-page document on a Smartphone, even if the Smartphone has a much smaller rendering surface. In one implementation, with the shared layout model (e.g., JSVM 112), each individual user device can use the shared layout model instead of having to develop new layout modules for different native platforms 110a-c. In this way, computation complexity at the native platform can be reduced.

In some implementations, the JSVM 112 can implement a painting component that is also independent of the native platform (e.g., configured by the native platform but the painting engine and code is shared). An application programming interface (API) for the layout, paint or canvas can be shared between different platforms.

Figure 2:
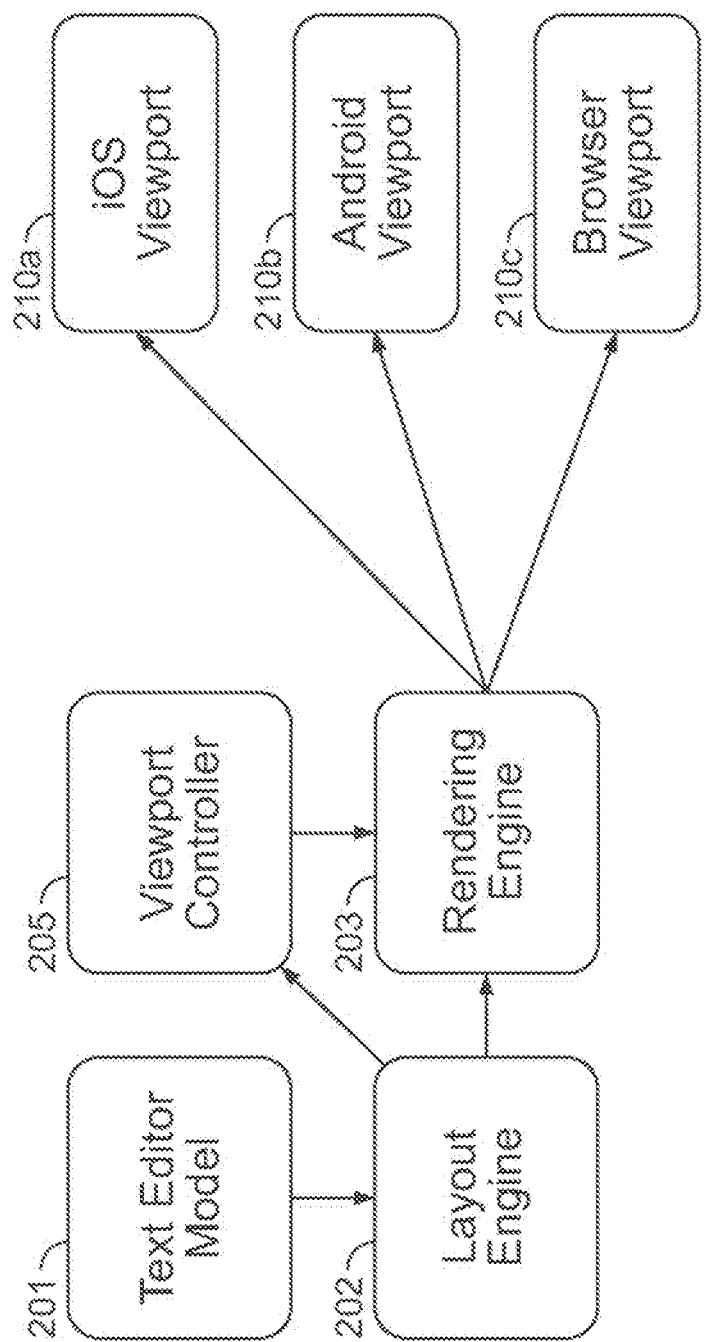
FIG. 2 provides an example block diagram illustrating an architecture of a shared layout mechanism for an application model, according to an illustrative embodiment.

FIG. 2 provides an example block diagram illustrating an architecture of a shared layout mechanism for an application model. For example, an application model can include a text editor model 201. The viewports 210a-c (e.g., a user interface area that presents a portion of an electronic document from the text editor on a user device,) of the text editor 201 across different platforms (such as different mobile operating systems, or different browsers on a computer, etc.), can be updated by a shared controller module.

The text editor model 201 may include information required to render the document, such as but not limited to textual content, image, font size, formatting parameters, and/or the like. The text editor model 201, however, may not need to generate any layout or rendering parameters, such as the position of a paragraph, an image, and/other objects when rendering the document, and/or the like. The layout engine 202 can be configured to process a document model from the text editor model and build a layout tree that contains the position information required for rendering. For example, the layout tree may have a root node as the entire document, a group of sub-nodes for a number of pages, and subsequently each sub-node of page may be further extended by sub-nodes of paragraphs, and so on. The rendering engine 203 can use the positioning information to issue canvas calls, e.g., a function in Javascript to present the content lay-out on a canvas, and then subsequently render a visible portion of the canvas on the various viewports 210a-c.

When a document model is updated (e.g., saved, restored, edited, and/or the like), the layout engine 202 may update the layout tree and notify the viewport controller 205 of the regions that need to be updated. The viewport 210a, 210b or 210c can then issue a paint request, e.g., to present a portion of the content of the electronic document via a visible user interface area on the user device.

For example, when the document is opened for the first time, the viewport controller 205 is notified that the entire view of the document needs to be updated. As mentioned earlier, the rendering engine 203 can generate and cache rendering information in a rendering tree and issue canvas calls to a specific region of the document. The viewport 210a-c may request a minimal number of canvas calls required at a time as those calls may be resource intensive to execute.

Figure 3:
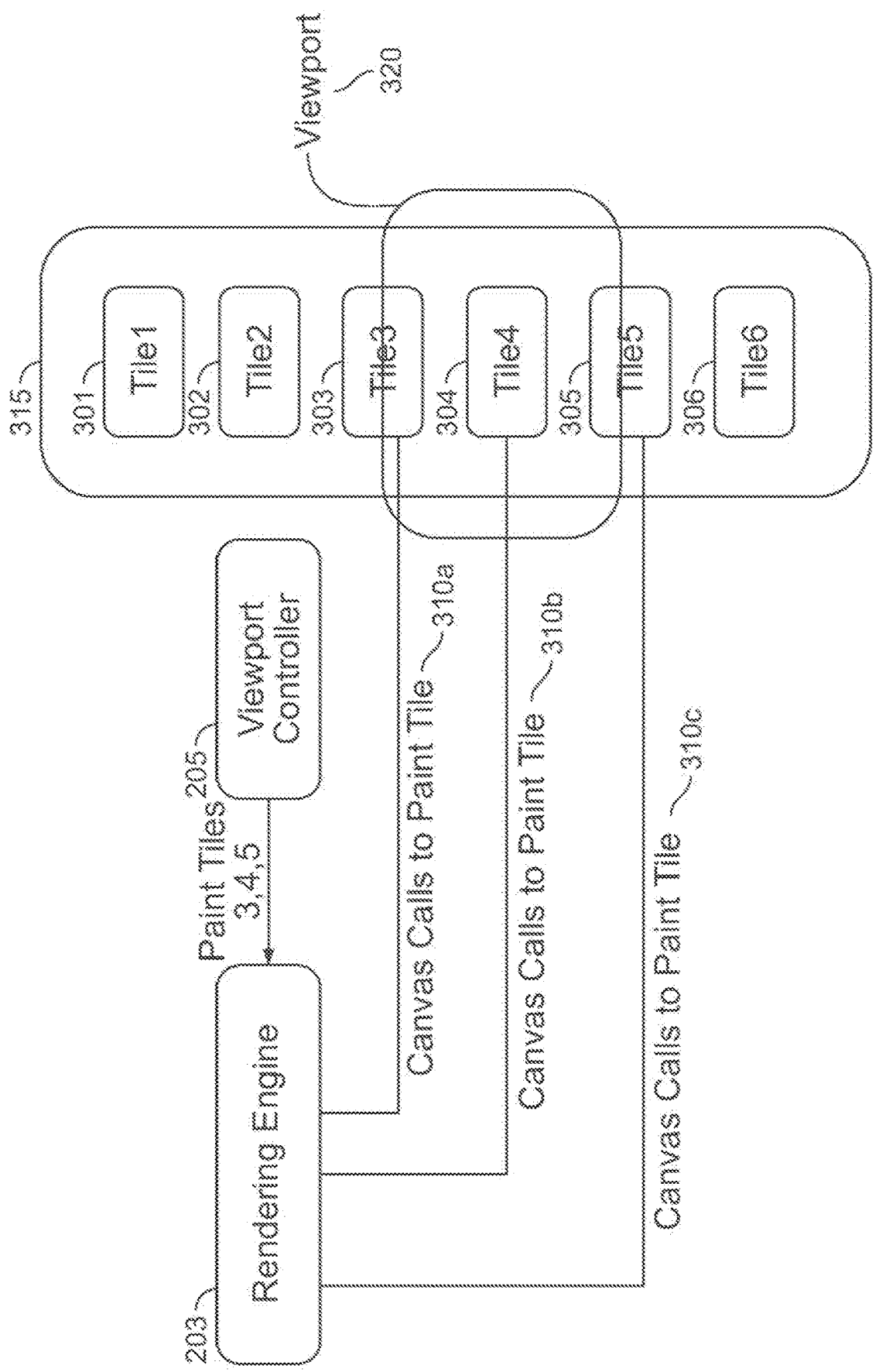
FIG. 3 provides an exemplary block diagram illustrating aspects of interactively rendering content of an electronic document on a viewport, according to an illustrative embodiment.

FIG. 3 provides an exemplary block diagram illustrating aspects of interactively rendering content of an electronic document on a viewport. In some implementations, the viewport controller 205 divides the canvas 315 into regions referred to as tiles 301-306. The tiles 301-306 are made the smallest units for which paint calls are requested from the rendering engine 203 (in other words, it is generally not possible to render only a portion of tile). The size of the tiles 301-306 is chosen based on various parameters including the size of the viewport and rendering engine limitations. For example, issuing paint calls to multiple small tiles might not be as efficient as painting a big tile that covers them all; and invalidating a big tile may be resource consuming when only a small portion of the big tile needs to be updated. Thus the size of the tiles may be determined depending on multiple factors. For example, the combination of all tiles should cover the entire canvas. However, only a limited subset of the tiles may be loaded and painted at a certain time depending on the viewport. This subset can include visible tiles (the tiles that overlap with the viewport).

In one implementation, the viewport controller 205 may choose to pre-render a few of nonvisible tiles in the vicinity of viewport to allow faster scrolling without rendering latency. It should be noted that painting of the tiles can be a resource intensive and time consuming operation and once the paint process of a tile is started, it is difficult to cancel. In the respective example of a text editor, the width of the viewport 320 is known (e.g., can be the same as the width of the tile) while the height is unknown (e.g., the viewport 320 can overlap with one or more tiles).

For example, as shown in the respective example in FIG. 3, tiles 3, 4, 5 (e.g., 303-305) overlap with the viewport 320 and may need to be painted. Therefore the viewport controller 205 requests the painting of tiles 3, 4, 5 from the rendering engine 203, resulting in the canvas calls 310*a-c* being issued to those tiles 303-305 to paint them.

Figure 4:
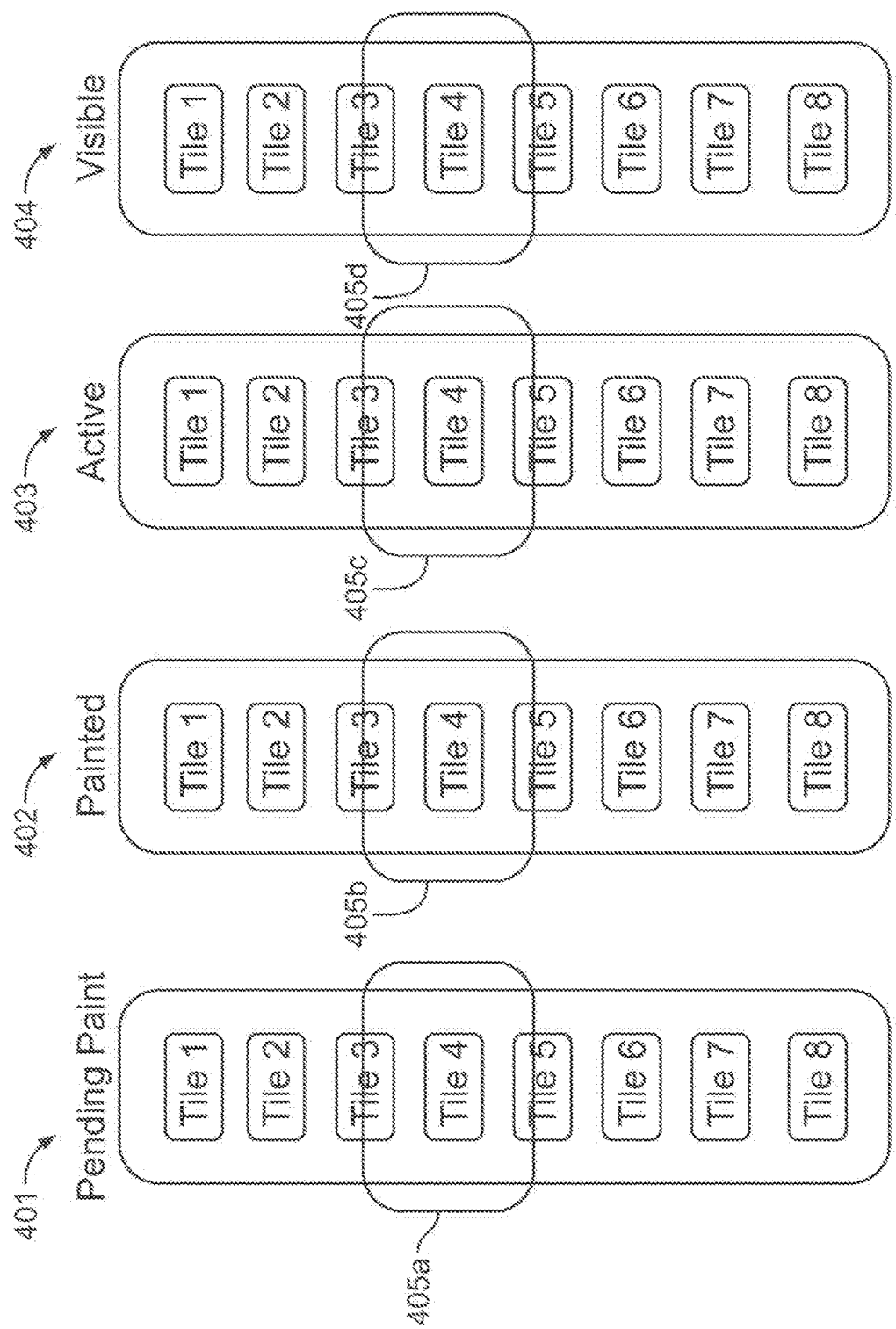
FIG. 4 provides an exemplary block diagram illustrating various statuses of tiles on a canvas, according to an illustrative embodiment.

FIG. 4 provides an exemplary block diagram illustrating various statuses of tiles on a canvas. As the user scrolls in the view, the viewport (e.g., 405*a-d*) changes and overlaps with a different set of tiles. In this case, the viewport controller may request the painting of the tiles in a way that the user experiences a smooth scrolling. For example, the viewport controller should try not to impose a heavy load on the thread that performs the scrolling to avoid stuttering in the scrolling behavior. The painting of the tiles may be done on another thread other than the scrolling thread to provide higher performance scrolling. However, when platform limitations may not allow both tasks to be done on the same thread, painting may be done to a secondary memory on another thread and later copied over to the screen.

In one implementation, paint jobs may not be cancelled once they start, and the viewport controller may build its own scheduling queue for painting of the tiles so that it has the ability to schedule and reschedule the paint operations. To ensure a smooth scrolling experience for a user with little latency, the viewport controller may paint tiles ahead of time before the user scrolls to related tiles, and caches the output of the paint. The output of the paint process can be cached in a format that requires minimum memory so that as many tiles can be cached as possible. Additionally, the saved format can have enough information to render tiles at all zoom scales. For example, example caching formats for the tiles may include, but not limited to PDF format, a display list, and/or the like.

As shown in FIG. 4, the viewport controller keeps various lists of different statuses of the tiles. For example, active tiles (as illustrated by tiles 2, 3, 4, 5, and 6 on canvas 403) are tiles that roughly overlap with a viewport 405*c*, and include a set of tiles that are pre-rendered for smooth scrolling. Anytime the viewport changes as the result of user scrolling or other actions, the set of active tiles for the viewport may need to be updated. For another example, visible tiles (as illustrated by tiles 3, 4, and 5 on canvas 404) are the set of tiles that strictly overlaps the viewport 405*d*. Visible tiles can be a subset of the active tiles. For another example, painted tiles (as illustrated by the tiles 4 and 8 on canvas 402) are the set of tiles that are fully painted. For another example, pending-paint tiles (as illustrated by the tiles 2, 3, 5 and 6 on canvas 401) are the list of tiles that are scheduled to be painted. The pending-paint tiles can be a subset of the active tiles.

When the viewport 405*c* changes, the list of active tiles is updated, and tiles that are no longer active are removed from the set of tiles that are pending to be painted. A scheduler keeps track of the status of the set of pending-paint tiles, and schedules a time when painting should be requested. The painting request can be scheduled on a separate operation queue. The output of the painting process may not be presented on the actual screen immediately. For example, an intermediate storage may be used to store the painted tiles as a PDF or a picture. Other structure or file format may also be used to store the output of the painting process, e.g., a specific implementation of the virtual canvas may be used for intermediate storage. Once the operation executed, it requests the paint and notifies the viewport controller when the painting job is complete to schedule the next pending tile paint. If the painting of a tile is scheduled but hasn't started and the tile becomes inactive, the scheduled paint will be cancelled. Once the painting process is complete for a visible tile or a painted tile becomes visible, the result of painting can be presented on the screen. The viewport controller can choose to invalidate a number of tiles if it is notified that the content of those tiles are out of date. The invalidated tiles are instantly removed from the set of painted tiles, and the viewport controller may schedule them for painting if they are active.

Figure 5:
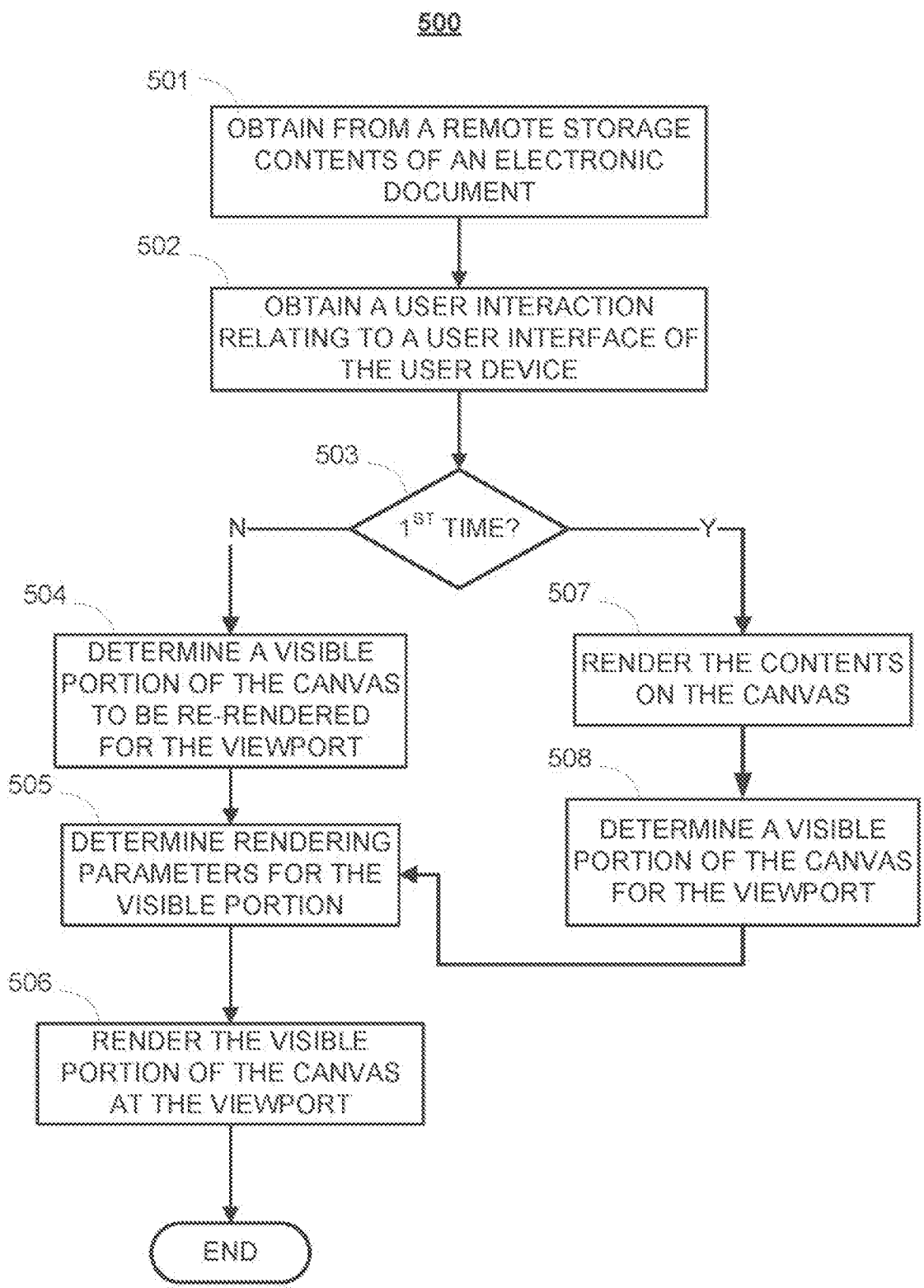
FIG. 5 provides an exemplary logic flow diagram 500 illustrating aspects of rendering a visible portion of a rendering surface at a viewport of a user device, according to an illustrative embodiment.

FIG. 5 provides an exemplary logic flow diagram 500 illustrating aspects of rendering a visible portion of a rendering surface at a viewport of a user device. At 501, a user device may obtain from a remote storage (e.g., a cloud storage system, etc.), content of an electronic document. At 502, the user device may obtain a user interactive action from a user interface of the user device, e.g., opening a document, page-up or page-down commands, scrolling movements, zoom-in or zoom-out commands, and/or the like. The user interactive action can be related to a visible portion of the canvas, e.g., the page-up or page-down, or zoom-in or zoom-out commands can indicate a visible portion of the canvas that is to be presented at the user interface visible to the user.

If it is the first time the document is rendered at the user interface of the device at 503, the entire content may be virtually rendered on the canvas at 507, and a visible portion of the canvas is determined for the viewport at 508. If the document has been previously rendered and the user interaction indicates an update at 503, a visible portion of the canvas that is to be re-rendered or updated in response to the user interaction is determined at 504.

Continuing on with 505, rendering parameters are then determined for the visible portion of the canvas, e.g., width and height of the visible portion from the canvas to be rendered, etc. The visible portion may then be rendered or re-rendered at the viewport at 506.

Figure 6:
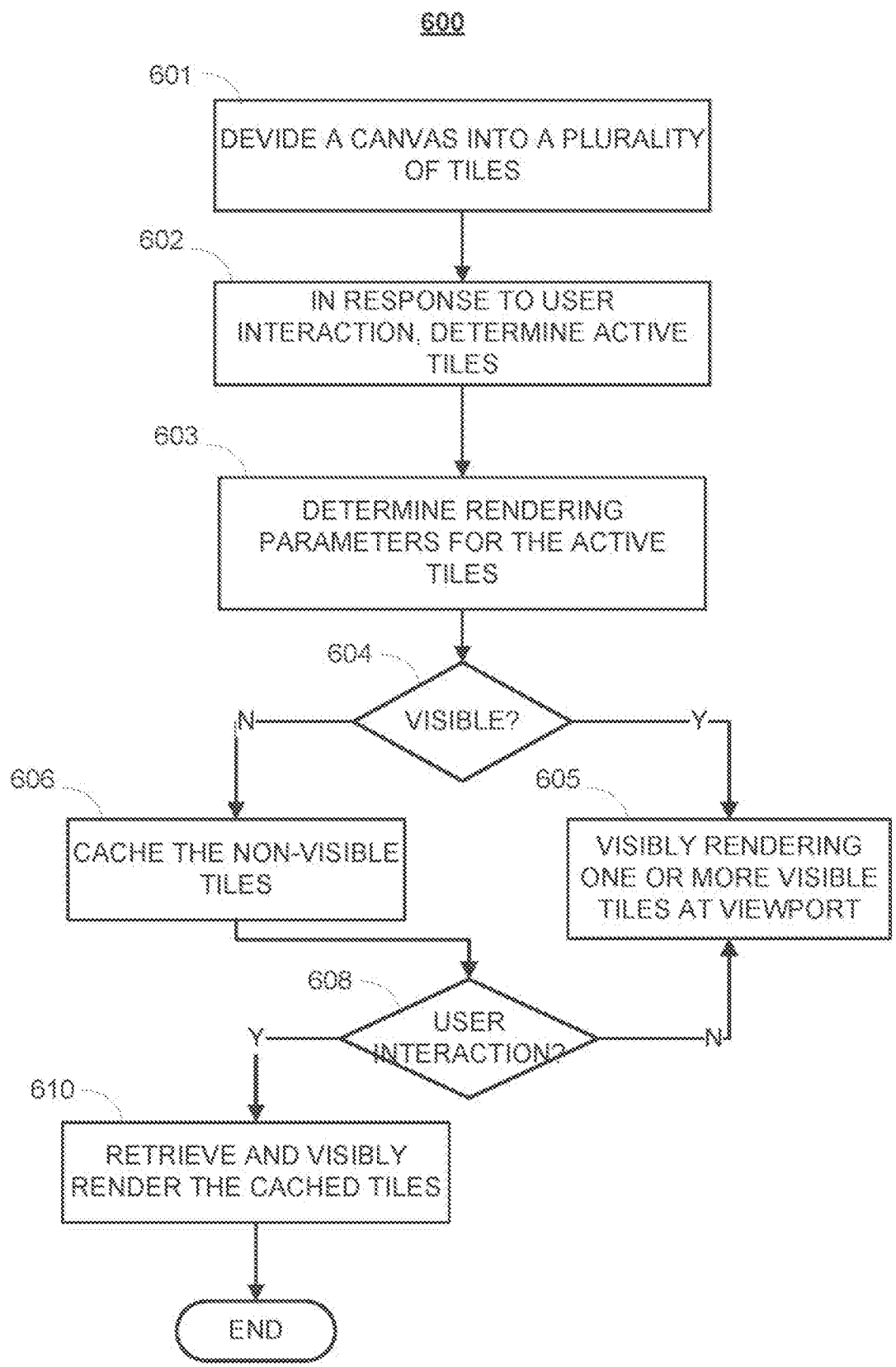
FIG. 6 provides an exemplary logic flow diagram 600 illustrating aspects of maintaining tiles of a canvas (e.g., see FIG. 4) to update or re-render a visible portion of a canvas at a viewport, according to an illustrative embodiment.

FIG. 6 provides an exemplary logic flow diagram 600 illustrating aspects of maintaining tiles of a canvas (e.g., see FIG. 4) to update or re-render a visible portion of a canvas at a viewport. For example, the canvas can be divided into a plurality of tiles (e.g., similar to 301-306 in FIG. 3) at 601.

In response to user interactions with a document (e.g., page-up or page-down commands, scrolling etc.), a list of active tiles (e.g., similar to tiles in 403 in FIG. 4) are determined at 602. For example, the active tiles include one or more tiles that overlap with the viewport and a few more tiles in the vicinity of the viewport. The tiles that overlap with the viewport are visible and need to be rendered, while the tiles in the vicinity that are not yet visible can be pre-rendered for smooth scrolling. At 603, rendering parameters can be determined for the active tiles, and making visible one or more visible tiles from the active tiles at the viewport at 605. Otherwise, for nonvisible tiles from the active tiles, these tiles are to be cached at 606. Thus, when another user interaction is received at 608, e.g., when the user scrolls the viewport such that the nonvisible tiles become visible in the viewport, the cached tiles can be retrieved and made visible at the viewport without rendering latency at 610. In this way, the user experience in smooth scrolling can be improved.

Figure 7:
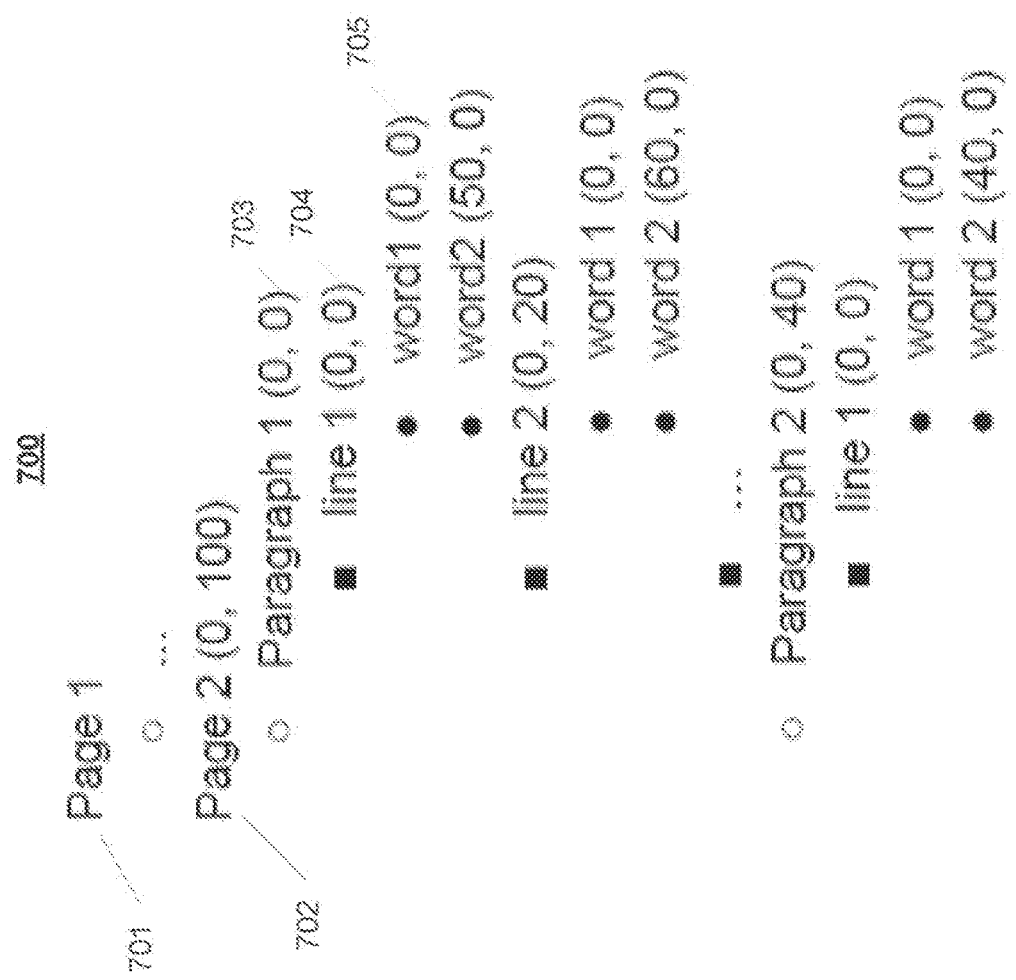
FIG. 7 provides an example diagram illustrating a layout tree structure of a document, according to an illustrative embodiment.

FIG. 7 provides an example diagram illustrating a layout tree structure of a document. In some instances, a document can be represented by a tree structure 700. For example, pages 701-702 can be a first layer of nodes in the tree structure, and each page 701-702 may be expanded in a tree structure including nodes representing paragraphs (e.g., 703), lines (e.g., 704), words (e.g., 705) and/or the like. The tree structure may be defined during a layout process, e.g., when the position and size of each node can be defined. The canvas may be associated with a state, e.g., a "snapshot" of the tree structure and parameters associated with each node in the tree structure.

When painting a (document) tree structure to a canvas, a number of calls (e.g., requests to perform an operation on the canvas) may be made to transform the canvas state, e.g., at least one by every node of the tree 700 to update the relevant node (e.g., paragraph, line, word, etc.), so that objects/text are painted relative to a specific coordinate or with specific transformation. Thus a significant number of save and/or restore calls may be performed to manage the canvas state. One way to reduce the number of save or restore calls is for every object of the tree, absolute coordinates (e.g., the position of an object relative to the entire canvas) are calculated, which are used for painting. However, the calculation of absolute coordinates for every object in the layout tree 700 may increase the complexity of the layout and rendering process.

Figure 8:
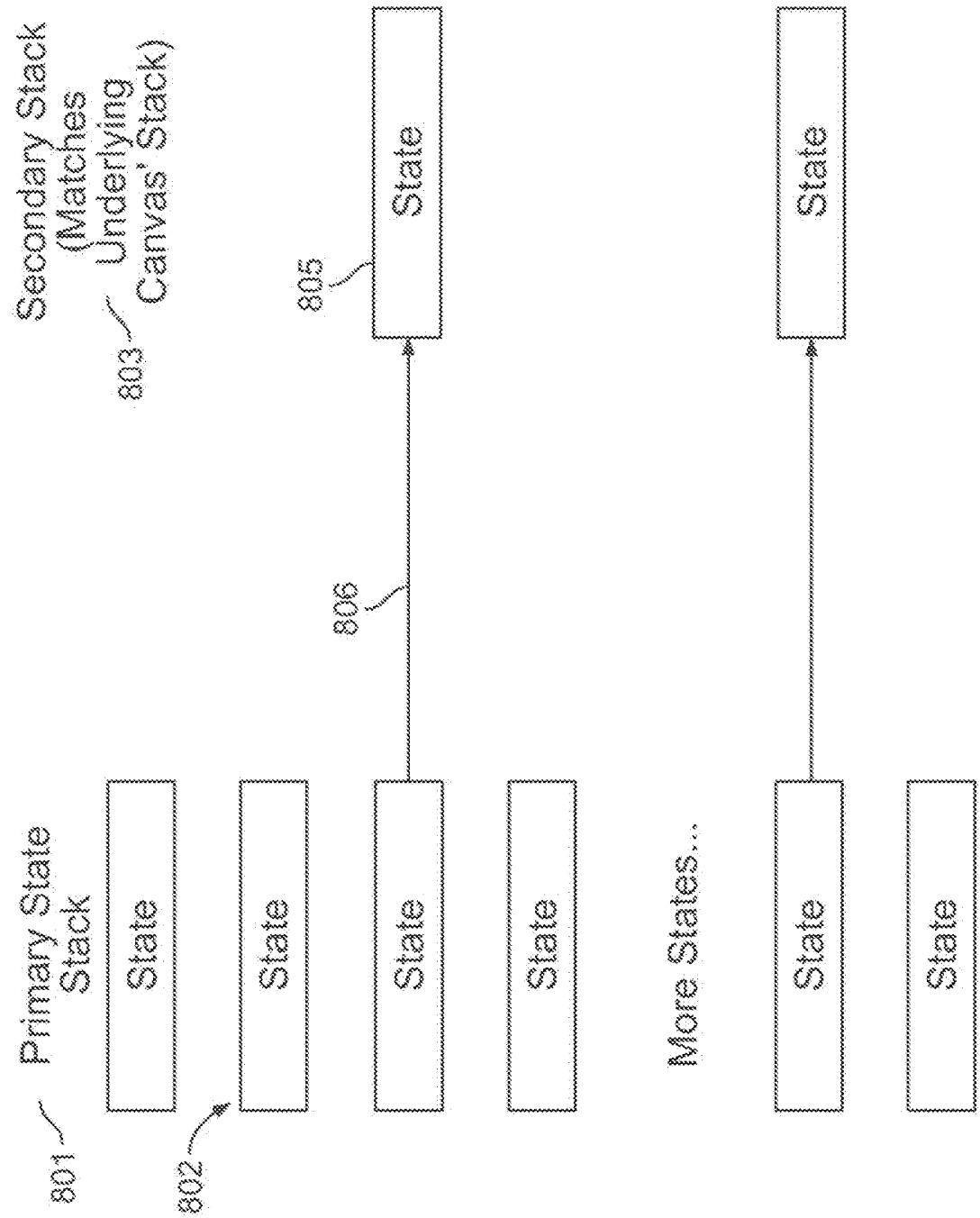
FIG. 8 provides an example diagram illustrating maintaining an underlying canvas for managing states of a canvas, according to an illustrative embodiment.

FIG. 8 provides an example diagram illustrating maintaining an underlying canvases for managing states of a canvas. The canvas, known as a primary canvas, can be associated with a primary stack 801 to store a plurality of states 802 of the canvas. A link 806 can be stored to correlate one of the states 802 of the primary canvas and a state 805 of the underlying canvas. To reduce the number of transform, save, restore calls to a canvas, a new layer, e.g., a virtual canvas associated with a secondary stack 803 can be introduced. This layer can be similar to the primary canvas, which passes all calls that performs any drawings to the primary canvas to the underlying canvas. However, calls that only modify the state of the canvas, like save, restore, or transformations may not be passed to the underlying canvas. Instead, these calls can be recorded, and processed in a batch such that these calls can be merged to reduce the number of calls invoked.

In one implementation, the underlying canvas stack 803 can have the states of what the user is expected to see and the primary stack 801 can have the states of what the code to paint the canvas may operate on. For example, the painting process may issue commands similar to the following:

1. canvas.save
2. canvas.setColor(black)
3. canvas.save
4. canvas.setColor(white)
5. canvas.draw
6. canvas.restore
7. canvas.draw
8. canvas.restore At step 8 above, the painting process expects the canvas state to have a color of black, so that it doesn't have to set it again. Thus, the canvas the painting process uses (e.g., the primary canvas) may have the color set to black, but the underlying canvas may not, until there is a draw command, where the color is used (because the underlying canvas represent a state of the canvas that the user is expected to see and thus may not need to be updated unless the color is used so that the user may see). Thus in the above example, at step 5 and 7 when the draw command is issued, the canvas.setColor(black) and canvas.setColor(white) calls are made to the underlying canvas, respectively.

For example, as shown at tree 700 in FIG. 7, the numbers in the brackets of each node represent relative coordinates to the parent node of the respective node. For instance, the coordinates (0, 0) of paragraph 1 at 703 shows paragraph 1 starts at a relative coordinate (0, 0) within page 2 at 702. Thus, in order to paint Page 2 702, the following commands may be issued:

1. [Page 2] save
2. [Page 2] transform 0, 100
3. [Paragraph 1] save
4. [Paragraph 1] transform 0, 0
5. [line 1] save
6. [line 1] transform 0, 0
7. [word 1] save
8. [word 1] transform 0, 0
9. [word 1] draw word 1 to (0, 0)
10. [word 1] restore
11. [word 2] save
12. [word 2] transform 50, 0
13. [word 2] draw word 2 (0, 0)
14. [word 2] restore
15. [line 1] restore
16. [line 2] save
17. [line 2] transform 0, 20
18. [word 1] save
19. [word 1] transform 0, 0
20. [word 1] draw word 1 (0, 0)
21. [word 1] restore
22. [word 2] save
23. [word 2] transform 60, 0
24. [word 2] draw word 2 (0, 0)
25. [word 2] restore
26. [line 2] restore
27. . . . .
28. [Paragraph 1] restore
29. . . . .
30. [Page 2] restore This could be changed into the following with several calls being merged with the exact same effect:

---

1. [word 1] draw word 1 to (0, 100)
2. [word 2] draw word 2 to (50, 100)

-continued

3. [word 1] draw word 1 to (0, 120)
4. [word 2] draw word 2 to (60, 120)

To achieve this, a transformation matrix can be maintained. A draw or paint command can be issued such that the coordinates from the transformation matrix can be attached to the draw command to indicate a location to paint. In another example, when an object (e.g., an image) has been rotated, the canvas state may be updated with the position and angle of the placement of the object before a new draw call can be performed.

Figure 9:
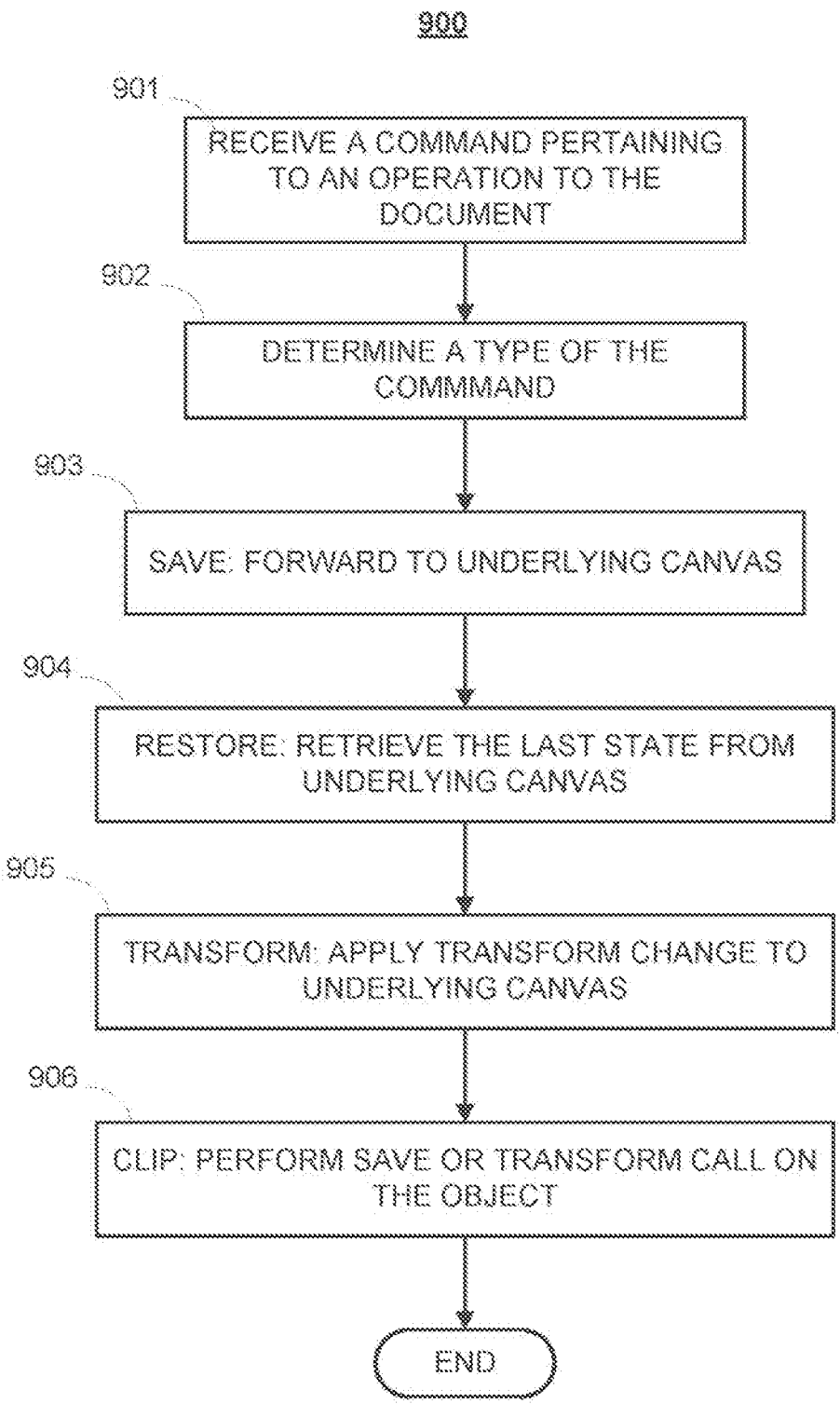
FIG. 9 provides an example logic flow diagram 900 illustrating aspects of managing operation calls relating to an electronic document, according to an illustrative embodiment.

FIG. 9 provides an example logic flow diagram 900 illustrating aspects of managing operation calls relating to a canvas of an electronic document. In some implementations, a user device receives a command via a user interface relating to a document (e.g., to change font size, style, color of the text, a selection of a portion of the text, etc.) at 901, which may result in multiple paint commands being issued. A shared layout component (e.g., the JSVM) may determine a type of the command at 902. If a save command is requested, and there was a save command before, the save command is forwarded to the underlying canvas at 903. The state in the actual canvas can be restored and the restored state can be applied on the underlying canvas (e.g. if restore changes the text color from black to red, the color on the underlying canvas can just be set to red, because it's less expensive than storing and restoring the full state). Thus changes may not need to be saved on the underlying canvas even if the changes have not been saved yet, unless the next command can only be undone by a restore call on the underlying canvas (e.g., a clip, while there is no unclip command, and clip may always intersects with the currently clipped area). To handle more complex situations of save, restore, transformation stacks, two stacks of states can be used as shown in FIG. 8. One of the two stacks can be what a user of the canvas can see and expect to have, and the other represents an underlying canvas with links between elements in the two canvases. In this way, the underlying canvas can save a copy of a current state of the canvas, such that a restore operation can be performed on the canvas.

For example, when a save command is received at the primary canvas (e.g., the actual canvas), the current state of the canvas is saved to a stack at 903. When a restore command is received at the user device, the last state can be retrieved from the stack to update the canvas, and the last state can be removed from the stack at 904. If the state has a connection to an underlying canvas state, a restore request can be performed on the underlying canvas, and the state can be removed from a second stack associated with the underlying canvas.

In another example, when a transform, or change style command is received at the primary canvas, the transformation or style change can be applied to the current transformation/style, and a draw or paint call can be applied to the canvas if necessary at 905. If the transformation is to translate only (e.g., no editorial changes made compared to the last save command issued to the underlying canvas), then the coordinates can be updated, and a draw command can be issued to the underlying canvas with the translated coordinates. If the transformation is more than just translation (e.g., including change of the content, etc.), and if the state is saved to the stack and it doesn't have a connection to a state in the second stack associated with the underlying canvas, then a save call is performed on the underlying canvas and the current state is saved to the second stack. Connections can be added between elements of the two canvases, and a transform call can be performed on the underlying canvas. If the style has been changed compared to the last style saved on the underlying canvas, the style change can be applied to the underlying canvas as well with a draw command on the underlying canvas.

In another example, a "clip" operation can be performed at 906, e.g., when an image is "clipped" or a portion of the image is "clipped" from its original version. If a state of the canvas is saved to the stack and it doesn't have a connection to a state in the second stack associated with the underlying canvas, then a save call can be performed on the underlying canvas to save the state to the second stack, and a connection can be established between the two canvases based on the newly saved state. A transform call is performed on the underlying canvas and a draw command is issued on the underlying canvas.

For example, assuming paragraph 1 line 2 as shown in FIG. 7 is changed in the following way:
Paragraph 1 (0, 0)
  . . .
  line 2 (0, 20)
    word 1 (0, 0)
    image (50, 0, 90°, clipped 5, 5, 40, 10)
    word 2 (100, 0)
The original command to paint paragraph 1 may be performed as follows:
1. [Paragraph 1] save
2. [Paragraph 1] transform 0, 0
3. [line 1] save
4. [line 1] transform 0, 0
5. [word 1] save
6. [word 1] transform 0, 0
7. [word 1] draw word 1 to (0, 0)
8. [word 1] restore
9. [image] save
10. [image] transform 50, 0, 90°
11. [image] clip 5, 5, 40, 10
12. [image] draw (0, 0)
13. [image] restore
14. [word 2] save
15. [word 2] transform 50, 0
16. [word 2] draw word 2 (0, 0)
17. [word 2] restore
18. [line 1] restore
The commands can change the calls made to the real canvas as follows:
1. [word 1] draw word 1 to (0, 120)
2. [image] save
3. [image] transform 50, 0, 90°
4. [image] clip 5, 5, 40, 10
5. [image] draw (0, 0)
6. [image] restore
7. [word 2] draw word 2 to (50, 120)

In this way, the complexity of managing the coordinates of different objects to determine the location to paint can be reduced, as there is no need for separate components to issue or perform a paint call when a save, restore or transformation request is received. In further implementations, embodiments described herein can be applied to reduce the number of paint-styling calls (e.g. changing the text color, font, line style of table borders, etc.).

Figure 10:
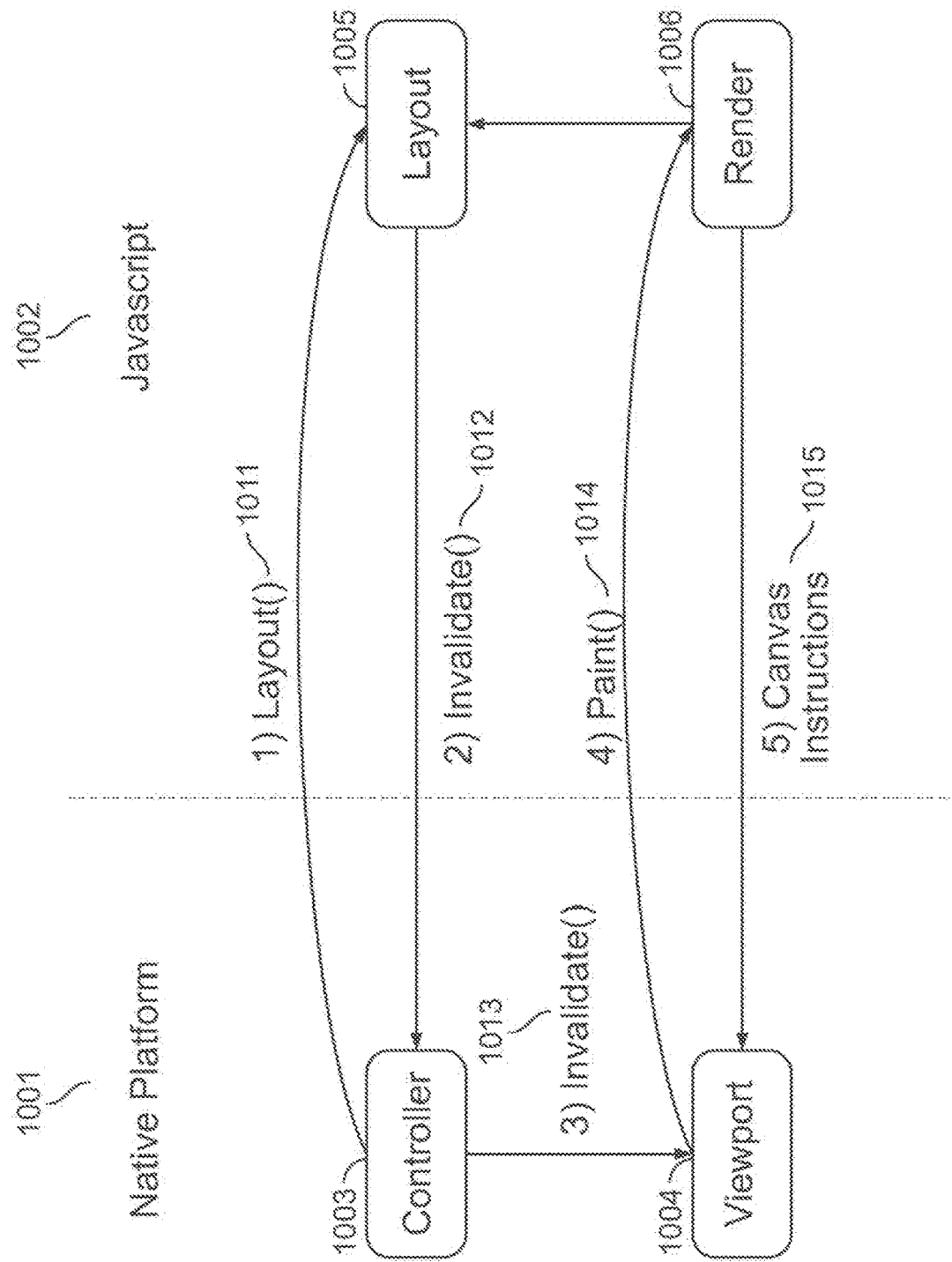
FIG. 10 provides an example block diagram illustrating interactive work flows between a native platform and a JSVM, according to an illustrative embodiment.

FIG. 10 provides an example block diagram illustrating interactive work flows between a native platform and a JSVM. In some implementations, the layout and rendering operations can be included in a JS (Javascript) program 1002, and the JS program 1002 can be run in the JSVM (e.g., 112 in FIG. 1) on mobile platforms or in the browser on desktop, e.g., a native platform 1001. In some implementations, user gestures (e.g., taps, flings, swipes, hovers, etc.) are also handled by the shared JS program 1002. Thus the native-platform specific code becomes a thin layer, which is a rendering surface, e.g., a "canvas" the shared JS code 1002 renders the content onto.

A controller 1003 at the native platform 1001 may send a layout request 1011 to the layout module 1005 within the shared JS code 1002. The shared JS code 1002 may then ask the native code for information on the viewport 1004 (e.g., size of the rendering surface, a portion to view, etc.) and then send an invalidation call 1012 to the controller, which may forward the invalidation call 1013 to the viewport 1004 to invalidate the portions of the viewport 1004 when the portions need to be re-rendered. The viewport 1004 may then send a paint call 1014 (e.g., a Javascript request to visibly present a portion of the document at the viewport) to the rendering module 1006 within the shared JS code 1002. The rendering module 1006 can generate canvas instructions 1015, e.g., parameters to render the content on the rendering surface, to the viewport 1004 to present the content.

Figure 11:
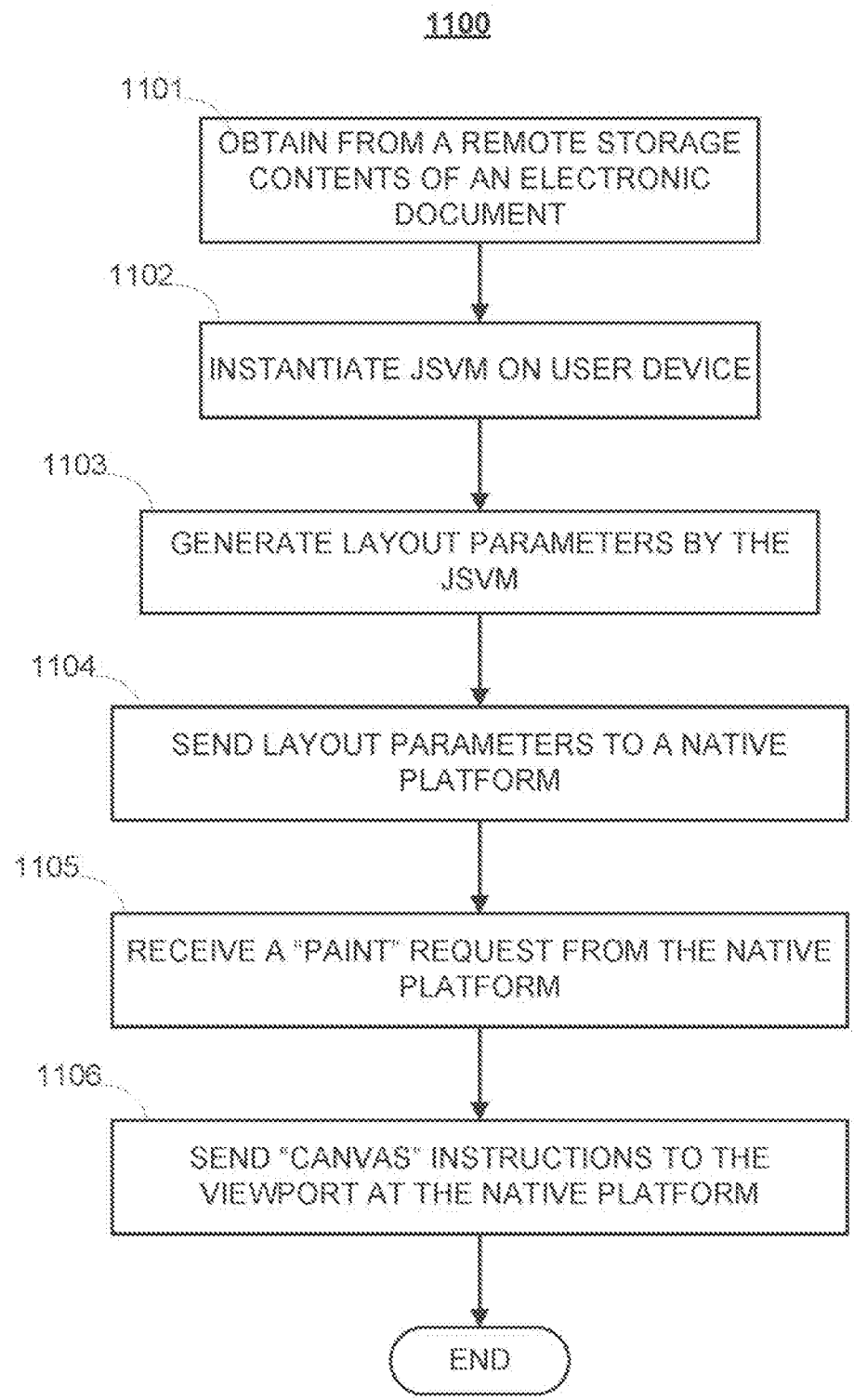
FIG. 11 provides an exemplary logic flow diagram illustrating managing a shared layout component to render content of an electronic document, according to an illustrative embodiment.

FIG. 11 provides an exemplary logic flow diagram illustrating managing a shared layout component to render content of an electronic document. Starting at 1101, a user device may obtain content of an electronic document from a remote storage system, e.g., a cloud system. The user device may instantiate a JSVM (e.g., similar to 112 in FIG. 2) at 1102 and generate layout parameters by the JSVM at 1103. For example, as previously discussed, the layout parameters may include the position of a specific word, sentence or paragraph, the position of a specific image in the document, and/or the like. The layout parameters are sent to a native platform at 1104. The JSVM may then receive a "paint" request from the native platform at 1105, to render the content of the electronic document at a rendering surface. The JSVM may then generate canvas instructions to place the relevant objects (e.g., words, sentences, paragraphs, images, etc.) onto a visible user interface on the respective user device screen at 1106.

Figure 12:
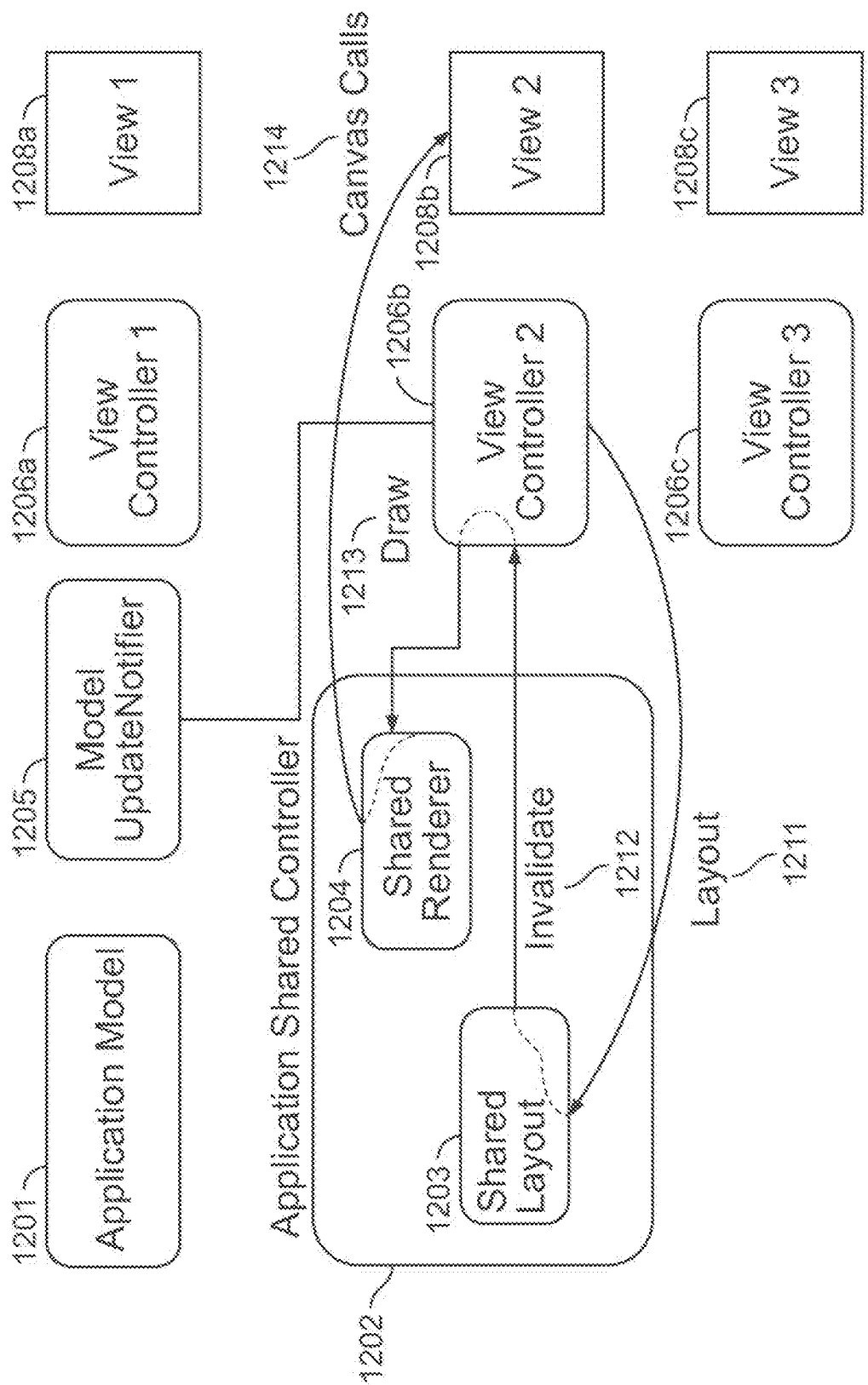
FIG. 12 provides an example block diagram illustrating an architecture with more than one view, according to an illustrative embodiment.

FIG. 12 provides an example block diagram illustrating an architecture with more than one view. For example, as shown in FIG. 12, the application model 1201 can provide a representation of a single model to multiple views 1208a-c across a single or multiple devices, e.g., the different view controllers 1206a-c can be associated with one or more different user devices.

In the illustrative example in FIG. 12, the application model 1201 can be a text editor that has a single model representing the document content. The model 1201 can be represented in different layout formats (paginated, flowing, etc.) and/or on different devices (e.g., a browser application on a computer, a mobile smart device, etc.). For example, an application shared controller 1202 can be similar to the JS program 1002 in FIG. 10, which can be shared among different applications or devices. The application shared controller 1202 may include the shared layout module 1203 and shared renderer 1204. On a single device, multiple layout formats can be presented and the user has the option to switch between them with only one view being active at a time. In the respective example, when the view controller 1206b may send a layout request 1211 to the shared layout module 1203. The shared layout module may in turn send an invalidation call 1212 to the view controller 1206b to re-draw a rendering surface. The view controller 1206b may send a "draw" request 1213 to the shared renderer 1204, which may send canvas instructions 1214 to generate a view 1208b.

The selected view controller 1206b can request the model 1201 to be updated with an updated notifier 1205. The model 1201 can also be updated externally by collaborators. When the model is changed for any reason, the view controller 1206 will be notified of the model change. If a view controller is active at the time that the change happens, the respective view controller (e.g., 1206b) updates its layout information and figures out the parts of the view (e.g., 1208b) that should be re-rendered.

Figure 13:
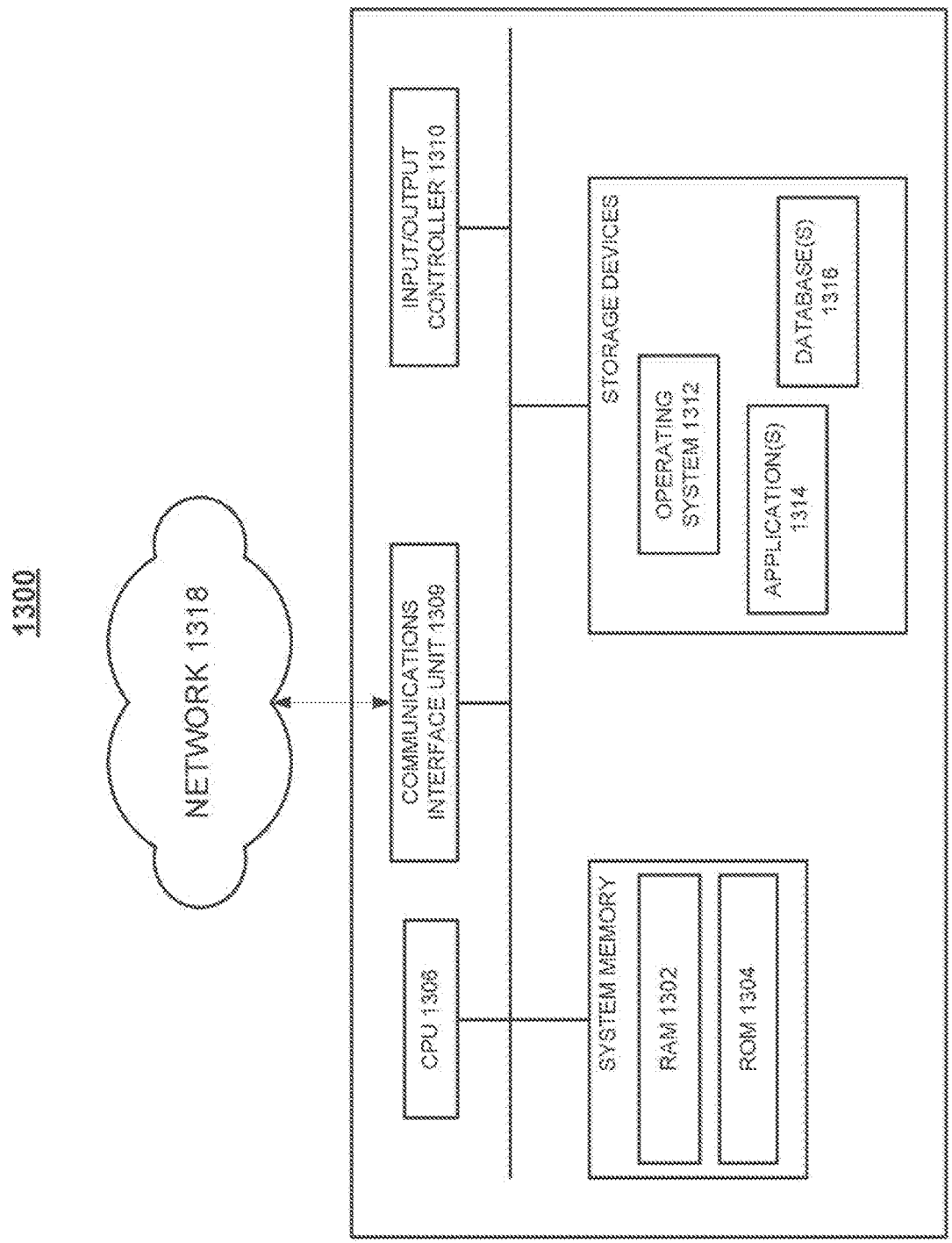
FIG. 13 is a block diagram illustrating an exemplary computer system 1300 with which the system for rendering a visible portion of a rendering surface at a user interface of a user device and use of FIGS. 1-12 can be implemented, according to an illustrative embodiment.

FIG. 13 is a block diagram of a computing device, such as any of the components of the systems of FIGS. 1-12, for performing any of the processes described herein. Each of the components of these systems may be implemented on one or more computing devices 1300. In certain aspects, a plurality of the components of these systems may be included within one computing device 1300. In certain implementations, a component and a storage device may be implemented across several computing devices 1300.

The computing device 1300 includes at least one communications interface unit, an input/output controller 1310, system memory, and one or more data storage devices. The system memory includes at least one random access memory (RAM 1302) and at least one read-only memory (ROM 1304). All of these elements are in communication with a central processing unit (CPU 1306) to facilitate the operation of the computing device 1300. The computing device 1300 may be configured in many different ways. For example, the computing device 1300 may be a conventional standalone computer or alternatively, the functions of computing device 1300 may be distributed across multiple computer systems and architectures. Alternatively, a computer system may be virtualized to provide the functions of multiple computing devices 1300. In FIG. 13, the computing device 1300 is linked, via network or local network, to other servers or systems.

The computing device 1300 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1309 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1306 includes a processor, such as one or more conventional microprocessors and one or more supplementary co-processors such as math co-processors for offloading workload from the CPU 1306. The CPU 1306 is in communication with the communications interface unit 1309 and the input/output controller 1310, through which the CPU 1306 communicates with other devices such as other servers, user terminals, or devices. The communications interface unit 1309 and the input/output controller 1310 may include multiple communication channels for simultaneous communication with, for example, other processors, servers or client terminals.

The CPU 1306 is also in communication with the data storage device. The data storage device may include an appropriate combination of magnetic, optical or semiconductor memory, and may include, for example, RAM 1302, ROM 1304, flash drive, an optical disc such as a compact disc or a hard disk or drive. The CPU 1306 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1306 may be connected to the data storage device via the communications interface unit 1309. The CPU 1306 may be configured to perform one or more particular processing functions.

The data storage device may store, for example, (i) an operating system 1312 for the computing device 1300; (ii) one or more applications 1314 (e.g., computer program code or a computer program product) adapted to direct the CPU 1306 in accordance with the systems and methods described here, and particularly in accordance with the processes described in detail with regard to the CPU 1306; or (iii) database(s) 1316 adapted to store information that may be utilized to store information required by the program.

The operating system 1312 and applications 1314 may be stored, for example, in a compressed, an uncompiled and an encrypted format, and may include computer program code. The instructions of the program may be read into a main memory of the processor from a computer-readable medium other than the data storage device, such as from the ROM 1304 or from the RAM 1302. While execution of sequences of instructions in the program causes the CPU 1306 to perform the process steps described herein, hard-wired circuitry may be used in place of, or in combination with, software instructions for implementation of the processes of the present invention. Thus, the systems and methods described are not limited to any specific combination of hardware and software.

Suitable computer program code may be provided for performing one or more functions in relation to performing the processes as described herein. The program also may include program elements such as an operating system 1312, a database management system and "device drivers" that allow the processor to interface with computer peripheral devices (e.g., a video display, a keyboard, a computer mouse, etc.) via the input/output controller 1310.

The term "computer-readable medium" as used herein refers to any non-transitory medium that provides or participates in providing instructions to the processor of the computing device 1300 (or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1306 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1300 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 1300 can include clients and servers. A client and server are generally remote from each other and typically interact through a communication network. The relationship of client and server arises by virtue of computer programs running on the respective computers and having a client-server relationship to each other. Computer system 1300 can be, for example, and without limitation, an enterprise server or group of servers, one or more desktop computers, one or more laptop computers, etc. Computer system 1300 can also be embedded in another device, for example, and without limitation, a mobile telephone, a personal digital assistant (PDA), a mobile audio player, a Global Positioning System (GPS) receiver, a video game console, and/or a television set top box.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
    accessing, by a user device from a server, content of an electronic document and a shared layout for the electronic document, wherein the shared layout provides a layout for a plurality of user devices having different dimensions of display areas;
    rendering the content of the electronic document onto a primary virtual rendering surface and a secondary virtual rendering surface, wherein the primary virtual rendering surface is associated with a native platform of the user device and the secondary virtual rendering surface is associated with the shared layout of the server;
    applying, by the user device, a plurality of operation commands to modify the primary virtual rendering surface, the plurality of operation commands resulting from a user interaction with the electronic document;
    merging, by the user device, the plurality of operation commands into a merged operation call, wherein the plurality of operation commands comprise relative coordinates that are specified relative to one or more parent nodes in a layout tree, and wherein merging the plurality of operation commands further comprise merging the relative coordinates into one or more absolute coordinates for the merged operation call, the one or more absolute coordinates corresponding to a position of at least a portion of the content of the electronic document relative to an entirety of the primary virtual rendering surface; and
    invoking, by the user device, the merged operation call to modify the secondary virtual rendering surface, wherein the merged operation call reduces a number of operation calls that modify the secondary virtual rendering surface and is shared with the server to modify the shared layout.

2. The method of claim 1, wherein the content of the electronic document comprises one or more of a word, a figure, a table, or an image that are represented by the one or more parent nodes of the layout tree for the electronic document.

3. The method of claim 1, wherein the primary virtual rendering surface comprises a plurality of tiles and wherein applying the plurality of operation commands comprises determining rendering parameters of a subset of the plurality of tiles that are active in view of the user interaction, determining which active tiles in the subset are visible, caching non-visible tiles from the subset, and rendering visible tiles from the subset based on the rendering parameters.

4. The method of claim 2, wherein the one or more absolute coordinates for the merged operation call are not specified relative to a parent node.

5. The method of claim 1, wherein the secondary virtual rendering surface has a secondary stack of states for rendering the content of the electronic document, wherein the primary virtual rendering surface has a primary stack of states, and wherein the method further comprises:
    maintaining one or more links between the primary stack of states and the secondary stack of states; and
    determining, in view of the one or more links, that the plurality of operation commands have been applied to the primary virtual rendering surface and not to the secondary virtual rendering surface since a save command was applied to the second virtual rendering surface.

6. The method of claim 5, further comprising:
    obtaining an operation command of the plurality of operation commands relating to the electronic document; and
    in response to determining that a command type of the operation command is a save command type or a transformation command type, applying the operation command to the primary virtual rendering surface to save a current state of the primary virtual rendering surface to the primary stack of states without applying the operation command to the secondary virtual rendering surface.

7. The method of claim 6, further comprising:
    obtaining a second and third operation command of the plurality of operation commands relating to the electronic document; and
    in response to determining that a command type of one of the second or third operation command is a restore command type:

applying the respective operation command to the primary virtual rendering surface to restore a state from the primary stack of states to the current state of the primary virtual rendering surface; and in response to determining that the links between the primary stack and the secondary stack comprise a link to the state of the primary stack that was restored to be the current state of the primary virtual rendering surface, applying the respective operation command to the secondary virtual rendering surface to restore a state from the secondary stack of states to a current state of the secondary virtual rendering surface and removing a state from the secondary stack of states that is linked to the state from the primary stack of states by the link.

8. The method of claim 7, further comprising:

obtaining a fourth operation command of the plurality of operation commands relating to the electronic document;

determining that a command type of the fourth operation command is a draw command type; and applying the fourth operation command to the primary virtual rendering surface to draw an object on the primary virtual rendering surface in view of the current state of the primary virtual rendering surface.

9. The method of claim 1, wherein the native platform comprises any of a mobile operating system or a browser application of a computer.

10. The method of claim 1, wherein the merging is performed by a layout component that is sharable to a second user device, wherein the second user device comprises a native platform that is different from the native platform of the user device.

11. A system comprising:

a memory that stores instructions; and a processor configured to execute the instructions to:

access, at a user device from a server, content of an electronic document and a shared layout for the electronic document, wherein the shared layout provides a layout for a plurality of user devices having different dimensions of display areas;

render the content of the electronic document onto a primary virtual rendering surface and a secondary virtual rendering surface, wherein the primary virtual rendering surface is associated with a native platform of the user device and the secondary virtual rendering surface is associate with the shared layout of the server;

applying a plurality of operation commands to modify the primary virtual rendering surface, the plurality of operation commands resulting from a user interaction with the electronic document;

merge the plurality of operation commands into a merged operation call, wherein the plurality of operation commands comprise relative coordinates that are specified relative to one or more parent nodes in a layout tree, and to merge the plurality of operation commands comprises merging the relative coordinates into one or more absolute coordinates for the merged operation call, the one or more absolute coordinates corresponding to a position of at least a portion of the content of the electronic document relative to an entirety of the primary virtual rendering surface; and invoke, by the user device, the merged operation call to modify the secondary virtual rendering surface, wherein the merged operation call reduces a number of operation calls that modify the secondary virtual rendering surface and is shared with the server to modify the shared layout.

12. The system of claim 11, wherein the one or more absolute coordinates for the merged operation call are not specified relative to a parent node of the one or more parent nodes.

13. The system of claim 12, wherein the secondary virtual rendering surface has a secondary stack of states for rendering the content of the electronic document, wherein the primary virtual rendering surface has a primary stack of states, and wherein the processor is further to:

maintain one or more links between the primary stack of states and the secondary stack of states; and determine, in view of the one or more links, that the plurality of operation commands have been applied to the primary virtual rendering surface and not to the secondary virtual rendering surface since a save command was applied to the second virtual rendering surface.

14. The system of claim 13, wherein the processor is further to:

obtain a first operation command of the plurality of operation commands relating to the electronic document;

in response to a determination that a command type of the first operation command is a save command type or a transformation command type, apply the first operation command to the primary virtual rendering surface to save a current state of the primary virtual rendering surface to the primary stack without application of the first operation to the secondary virtual rendering surface;

obtain a second operation command relating to the electronic document; and in response to a determination that a command type of the second operation command is a restore command type:

apply the second operation command to the primary virtual rendering surface to restore a state from the primary stack to be the current state of the primary virtual rendering surface; and in response to a determination that the links between the primary stack of states and the secondary stack of states comprise a link to the state that was restored to the current state of the primary virtual rendering surface, apply the second operation command to the secondary virtual rendering surface to restore a state from the secondary stack of states to a current state of the secondary virtual rendering surface and remove a state from the secondary stack of states that is linked to the state from the primary stack of states by the link.

15. The system of claim 14, wherein the processor is further to:

obtain a fourth operation command of the plurality of operation commands relating to the one or more parent nodes;

determine that a command type of the fourth operation command is a draw command type;

apply the fourth operation command to the primary virtual rendering surface to draw an object on the primary virtual rendering surface in view of the current state of the primary virtual rendering surface;

determine that at least one fifth operation command having the transformation command type other than a translation command type has occurred since a last one of the save command type was applied to the secondary virtual rendering surface;

determine that the links between the primary stack of states and the secondary stack of states do not comprise a link from the secondary stack of states to the current state of the primary virtual rendering surface in the primary stack of states;

apply the save command type to the secondary virtual rendering surface to save the current state of the primary virtual rendering surface to the secondary stack of states;

add the link from the secondary stack of states to the current state of the primary virtual rendering surface in the primary stack of states; and apply the fifth operation command and then the fourth operation command to the secondary virtual rendering surface.

16. A non-transitory processor-readable storage medium storing instructions that, when executed by a processor, cause the processor to:

access, by a user device from a server, content of an electronic document and a shared layout for the electronic document, wherein the shared layout provides a layout for a plurality of user devices having different dimensions of display areas;

render the content of the electronic document onto a primary virtual rendering surface and a secondary virtual rendering surface, wherein the primary virtual rendering surface is associated with a native platform of the user device and the secondary virtual rendering surface is associated with the shared layout of the server;

applying, by the user device, a plurality of operation commands to modify the primary virtual rendering surface, the plurality of operation commands resulting from a user interaction with the electronic document;

merge, by the user device, the plurality of operation commands into a merged operation call, wherein the plurality of operation commands comprise relative coordinates that are specified relative to one or more parent nodes in a layout tree, and wherein merging the plurality of operation commands further comprise merging the relative coordinates into one or more absolute coordinates for the merged operation call, the one or more absolute coordinates corresponding to a position of at least a portion of the content of the electronic document relative to an entirety of the primary virtual rendering surface; and invoke, by the user device, the merged operation call to modify the secondary virtual rendering surface, wherein the merged operation call reduces a number of operation calls that modify the secondary virtual rendering surface and is shared with the server to modify the shared layout.

17. The non-transitory processor-readable storage medium of claim 16, wherein the one or more absolute coordinates for the merged operation call that are not specified relative to a parent node.

18. The non-transitory processor-readable storage medium of claim 16, wherein the secondary virtual rendering surface has a secondary stack of states for rendering the content of the electronic document, wherein the primary virtual rendering surface has a primary stack of states, and wherein the instructions are further to cause the processor to:

maintain one or more links between the primary stack of states and the secondary stack of states; and determine that the plurality of operation commands have been applied to the primary virtual rendering surface and not to the secondary virtual rendering surface since a save command was applied to the secondary virtual rendering surface.

19. The non-transitory processor-readable storage medium of claim 18, wherein the instructions are further to cause the processor to:

obtain an operation command of the plurality of operation commands relating to the electronic document; and in response to a determination that a command type of the operation command is a save command type or a transformation command type, apply the operation command to the primary virtual rendering surface to save a current state of the primary virtual rendering surface to the primary stack of states without application of the operation command to the secondary virtual rendering surface.

20. The non-transitory processor-readable storage medium of claim 19, wherein the instructions are further to cause the processor to:

obtain a third operation command of the plurality of operation commands relating to the electronic document;

determine that a command type of the third operation command is a draw command type; and apply the third operation command to the primary virtual rendering surface to draw an object on the primary virtual rendering surface in view of the current state of the primary virtual rendering surface.

* * * * *